United States Patent [19]

Adams

[11] 4,429,621
[45] Feb. 7, 1984

[54] HYDRAULIC SYSTEMS

[75] Inventor: Frederick J. Adams, Avon, England

[73] Assignee: Cam Gears Limited, Hertfordshire, England

[21] Appl. No.: 255,557

[22] Filed: Apr. 20, 1981

Related U.S. Application Data

[63] Continuation-in-part of Ser. No. 962,677, Nov. 21, 1978, abandoned.

[30] Foreign Application Priority Data

Nov. 24, 1977 [GB] United Kingdom ............... 48959/77

[51] Int. Cl.³ .................... F15B 11/08; F15B 13/04; F16K 31/12
[52] U.S. Cl. .......................... 91/420; 91/446; 91/463; 91/468; 137/501; 137/596.13; 251/48; 251/64; 251/121
[58] Field of Search ............... 91/420, 446, 463, 468, 91/DIG. 2; 137/596.13, 501, 514; 251/63, 48, 12, 121, 297, 64

[56] References Cited

U.S. PATENT DOCUMENTS

| | | | |
|---|---|---|---|
| 2,845,901 | 8/1958 | MacDuff | 91/420 |
| 3,086,551 | 4/1963 | Gordon | 251/64 |
| 3,439,697 | 4/1969 | Blanchette et al. | 251/297 |
| 3,749,112 | 7/1973 | Nishikawa et al. | 91/420 |
| 4,178,962 | 12/1979 | Tennis | 137/596.13 |
| 4,329,912 | 5/1982 | de Maight et al. | 91/420 |

Primary Examiner—Robert E. Garrett
Assistant Examiner—Richard L. Klein
Attorney, Agent, or Firm—Yount & Tarolli

[57] ABSTRACT

An hydraulic system: a power assisted vehicle steering system which includes such an hydraulic system and a method of alleviating noise in an hydraulic system. The hydraulic system as applied to a vehicle steering gear (1) has an open center valve (3) which directs hydraulic fluid under pressure derived from a pump (12) and in response to a steering maneuver through a shaft (4) to a servo motor of the gear (1). Downstream of the open center valve (3) is a restrictor (8) through which hydraulic fluid from the valve (3) passes to a reservoir (11). The restriction effected by the restrictor (8) to fluid flow from the valve (3) to the reservoir is variable to provide a throttling action and a back pressure in the line (6) to alleviate noise in the valve (3).

2 Claims, 6 Drawing Figures

HYDRAULIC SYSTEMS

PRIORITY

This application is a continuation-in-part application of U.S. patent application Ser. No. 962,677, filed Nov. 21, 1978, now abandoned. Benefit of the earlier filing date for the aforementioned application Ser. No. 962,677 is hereby claimed under the provisions of 35 USC 120.

TECHNICAL FIELD

This invention relates to an hydraulic system, a power assisted steering system which includes such an hydraulic system, and a method of alleviating noise in an hydraulic system. The invention is particularly concerned with hydraulic and steering systems which include open centre valves.

PRIOR ART

Open centre hydraulic valves are well known in the art and comprise an adjustable component (such as a spool) which has an "open centre" or neutral condition in which hydraulic fluid can pass the control surfaces or ports of the valve components with the minimum of restriction and in which when the constituent parts of the valve are displaced relatively (usually progressively), fluid flow from the pressure source is directed (usually increasingly) to such means as is intended to be actuated by the hydraulic pressure. In a hydraulic system which includes an open centre valve it is often found that as the valve is progressively displaced from its neutral condition a noise develops (usually in the form of a hiss) which can be both annoying and distracting. It is believed that this noise is developed as a result of the passage of the hydraulic fluid at relatively high speed through the system, particularly through the ports and passages of the open centre valve and it is an object of the present invention to provide a system by which the aforementioned noise can be alleviated.

STATEMENT OF INVENTION AND ADVANTAGES

According to the present invention there is provided an hydraulic system comprising an open centre valve; a pump upstream of the valve for supplying hydraulic fluid under pressure to the valve; a restrictor downstream of the valve through which hydraulic fluid from the valve passes, and means for varying the restriction to which fluid flow is subjected by the restrictor during its passage therethrough from the valve to a sink.

Further according to the present invention there is provided a method of alleviating noise in an hydraulic system having an open centre valve and a pump upstream of the valve for supplying hydraulic fluid under pressure to the valve and which method comprises locating in the system, at a position downstream of the valve, a variable restrictor through which hydraulic fluid from the valve passes and varying the restriction provided by the restrictor to subject the fluid which flows therethrough and from the valve to a throttling action.

The throttling of fluid as it passes from the open centre valve and through the restrictor to the sink (usually a reservoir) is preferably arranged to increase as the working pressure increases in the open centre valve, as a result of operation of this valve so that, by the throttling effect, and increasing back pressure is applied to fluid flow through the open centre ports of the valve. It is believed to be this increase in back pressure (which is proportional to the working pressure) caused by the restrictor valve, that smoothes the pressure variations within the open centre valve and thus alleviates the noise. Variations in speed of fluid flow within the open centre valve will primarily result as the open centre ports in the valve are progressively closed and opened during adjustment of the valve respectively from and towards its neutral condition. In particular when the valve is in its open centre condition and is then adjusted to direct fluid to such auxiliary means as is intended to be actuated, the open centre ports in the valve through which fluid flows directly from the pump to the restrictor will close progressively and, during their closing, because the flow areas are decreasing, the speed of flow of fluid through the open centre valve internal ports will progressively increase to develop or increase noise. Alternatively, the speed of fluid flow through the open centre valve may result from variations in the speed of the pump which feeds the open centre valve (particularly if such pump is driven directly by a variable speed engine).

Conveniently the restrictor is in the form of a spool, rotor or needle, having means associated therewith by which it can be adjusted to increase or decrease the throttling effect on fluid flow from the open centre ports of the valve.

Adjustment of the restrictor can be effected manually or automatically. A convenient form of manual adjustment is a drawer cable by which remote control of the restrictor can be effected. It is envisaged that control of the restriction provided by the restrictor will more usually be effected automatically in response to variations in fluid pressure on a component of the restrictor. In one example of automatic control of the restrictor an element in the restrictor can be subjected to hydraulic fluid pressure derived from a position upstream of the open centre valve and downstream of the pump so that as such hydraulic fluid pressure increases and decreases (in response to the open centre valve being displaced respectively from and towards its neutral condition) so the restriction or throttling effect provided by the restrictor respectively increases and decreases. Conveniently the hydraulic fluid pressure automatic control of the restrictor is achieved by subjecting the said element, such as a spool, in the restrictor to a hydraulic fluid pressure differential which causes displacement of the element to increase or decrease the throttling effect of fluid flow through the restrictor as appropriate; such fluid pressure differential can be achieved by subjecting one side of the element to hydraulic fluid pressure derived from the aforementioned position upstream of the open centre valve and downstream of the pump while the opposite side of the element is subjected to hydraulic fluid pressure derived from a position downstream of the openable and closable ports of the valve so that, when the valve is displaced from its neutral condition and fluid pressure develops upstream thereof, the element in the restrictor is subjected to a fluid pressure differential which creates a throttling effect on fluid flow through the restrictor and a back pressure from the restrictor to the open centre valve to reduce the pressure fluctuations within the open centre valve and thereby alleviate the development of noise.

The spool of the restrictor is biased to a minimum restriction position by biasing means, i.e., a spring, acting on the side of the spool which is subjected to a hydraulic fluid pressure derived from a position downstream of the open centre valve. The biasing means are advantageously located in the fluid chamber of the restrictor through which the fluid from the open centre valve passes to a sink. The use of biasing means prevents the spool from being displaced until the hydraulic fluid pressure differential acting on the spool reaches a predetermined amount.

The biasing means biasing the spool to a minimum restriction position may also be located outside of the restrictor fluid chamber, and the restrictor may have a third surface which has a cross-section area equal to the cross-section area of the second surface and on which the hydraulic fluid pressure derived from a position downstream of the open centre valve acts in a direction opposite to the direction in which said pressure acts on the second surface. In this case the hydraulic fluid pressure acting on the second surface will be balanced by hydraulic fluid pressure acting on the third surface, and the predetermined hydraulic fluid pressure which displaces the spool from its minimum restriction position will be determined only by biasing force of the biasing means.

The present invention although suitable for general application was primarily developed for application to a power assisted vehicle steering system in which the open centre valve is adjustable in response to a steering manoeuvre to direct fluid under pressure from the pump to power assistance means (which, by way of example, can be in the form of a double acting piston and cylinder device appropriately coupled to assist in displacement of the steering linkage). The aforementioned hissing noise is particularly annoying and distracting when it occurs in power assisted steering gears and therefore there is further provided a power assisted vehicle steering system which includes an hydraulic system as above specified as being in accordance with the present invention.

For convenience of location, assembly, and/or manufacture, it is envisaged that the restrictor can form part of the pump, a sink (which will usually be an hydraulic fluid reservoir) or the open centre valve unit (which, in the case of a vehicle steering gear, will usually be incorporated in the housing of the steering gear).

Embodiments of the present invention will now be described, by way of example only, with reference to the accompanying illustrative drawings in which:

FIG. 1 diagrammatically illustrates a power assisted vehicle steering system constructed in accordance with the invention in which automatic control of the restrictor is effected by variations in hydraulic pressure;

Where possible throughout the following description the same parts or members in each of the Figures have been accorded the same references.

Figure 1:
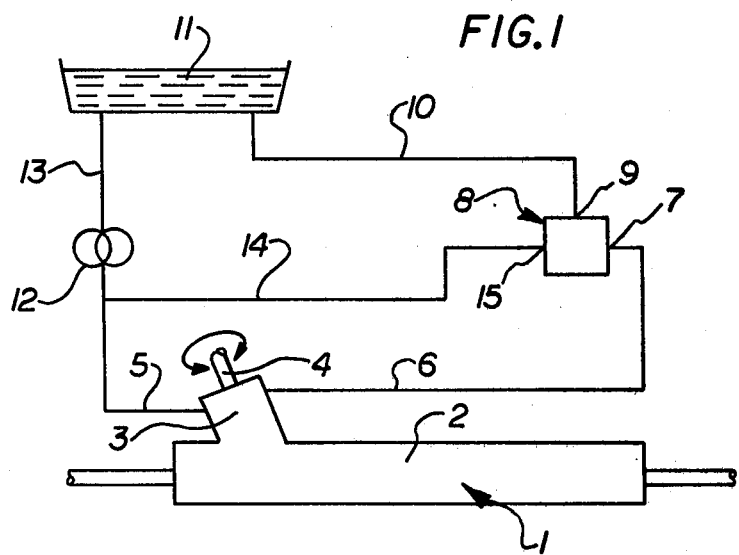

The system has a conventional form of power assisted vehicle steering gear 1 which comprises a rack and pinion gear 2 with an open centre valve (indicated at 3) incorporated in the housing of the steering gear.

The valve 3 is controlled by rotation of a steering column 4 to direct hydraulic fluid under pressure from a pressure line 5 to a power assistance servo motor incorporated within the housing of the gear 2. The servo motor is conveniently in the form of a double acting piston and cylinder device to one or the other side of which hydraulic fluid is directed as appropriate to assist in steering which results from longitudinal movement of the rack bar. Hydraulic fluid is directed to the servo motor in response to rotation of the steering column 4 and displacement of the open centre valve 3 in one or the opposite sense of direction from its neutral condition. In its neutral condition, open centre ports of the valve 3 permit fluid to flow directly from the pressure line 5 to a return line 6. As the valve 3 is progressively displaced from its neutral condition hydraulic fluid is increasingly directed from the pressure line 5 to actuate one or other side of the servo motor as appropriate. An example of a suitable form for the power assisted steering gear 1 and valve 3 is disclosed in our U.K. Patent Specification No. 1,465,901.

The return line 6 communicates with an inlet port 7 of a restrictor unit 8 which also has an outlet port 9 communicating by way of a further return line 10 with a reservoir 11 of hydraulic fluid. The pressure line 5 communicates with the outlet of a pump 12 which draws hydraulic fluid from the reservoir 11 by way of a line 13.

Figure 2:
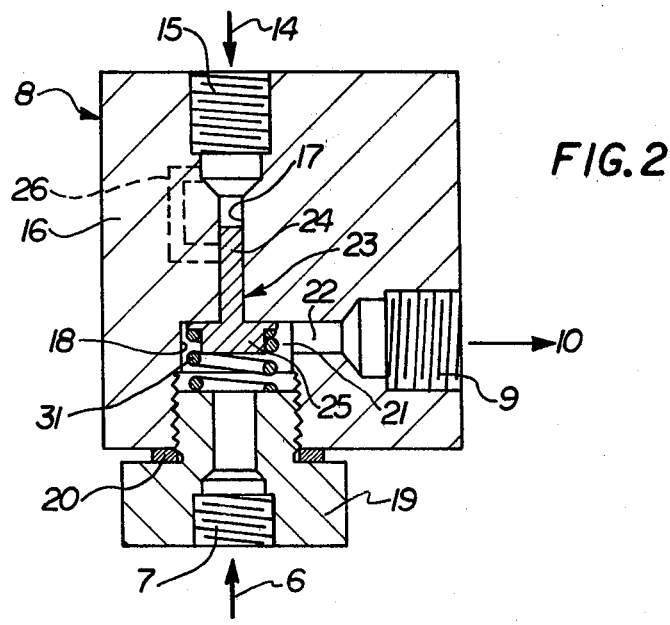
FIG. 2 is a section through the restrictor which is incorporated in the system of FIG. 1.

In the embodiment of FIGS. 1 and 2 the pressure line 5 communicates through a bridging line 14 with a second inlet port 15 of the restrictor unit 8.

Referring particularly to FIG. 2 the restrictor unit 8 has a housing 16 provided with a through bore 17. One end of the bore 17 is counterbored to provide the inlet port 15 and is internally screw threaded to provide a convenient means for coupling with the line 14. The other end of the through bore 17 is counterbored 18 and screw threaded to receive a complementary screw threaded plug 19 which carries the inlet port, the latter being internally screw threaded to provide a convenient means for coupling with the return line 6. A sealing ring 20 is provided between the plug 19 and housing 16. The port 7 is in alignment with the through bore 17 and opens into a chamber 21 formed in the housing 16 between the inner end face of the plug 19 and the inner end of the counterbore 18. The return port 9 is in constant communication with the chamber 21 through a passage 22 and is also screw threaded to provide a convenient means for coupling with the return line 10.

Located within the housing 16 is a spool 23 having a cylindrical part 24 which is received as a close axially sliding fit within the bore or spool cylinder 17 and an enlarged diameter head part 25 which is located in the chamber 21. As shown in FIG. 2 the shoulder formed between the head and reduced diameter part of the spool 23 is capable of abutting in substantially face-to-face relationship with the bottom face of the counterbore 18. It will also be apparent from FIG. 2 that the spool 23 is located in the housing 16 upon removal of the plug 19.

In use of the system shown in FIGS. 1 and 2 it is envisaged that the pump 12 will be driven by the vehicle engine and, since it is normal in power assisted steering applications to incorporate a flow control valve within the pump, it is expected to provide a constant fluid flow. With the valve 3 in its neutral or open centre condition the output from the pump will pass directly from line 5 through the open centre ports of the valve to line 6 and then by way of port 7, chamber 21, passage 22, port 9 and line 10 to return to the reservoir 11. In addition, fluid is available in line 14 (which is downstream of the pump 12) and therefore at the port 15 which is at the same pressure as in line 5.

With the valve 3 in its neutral open centre condition the flow of fluid from line 6 on to the spool head 25 will be sufficient to hold the spool in its "fully-in" position as shown in FIG. 2 (where the head abuts against the bottom face of the counterbore 18).

Figure 2A:
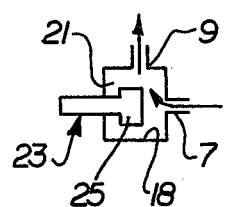
FIGS. 2A and 2B illustrate various stages of adjustment of the restrictor in FIG. 2.
Figure 2B:
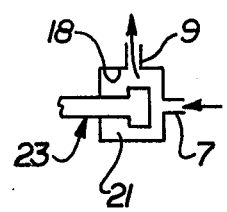

When a steering manoeuvre is effected and the column 4 rotated, the valve 3 is progressively displaced from its neutral condition to increasingly direct fluid from the pressure line 5 to the appropriate side of the servo motor and the open centre ports in the valve are progressively closed to the passage of fluid from the pressure line 5 directly to the return line 6. During the closure of the open centre ports and actuation of the servo motor, fluid pressure increases in the pressure line 5 and consequently in the bridging line 14, and this causes the spool 23 to be displaced axially in the housing so that its part 24 slides through the bore 17 and partially into the chamber 21 as indicated in FIG. 2A. As the fluid pressure increases at port 15 the spool 23 will be progressively displaced into the chamber 21 as shown in FIG. 2B and so provide increasing restriction to the flow of fluid from port 7 through chamber 21 to passage 22 and to the reservoir 11. The effect of the aforementioned increasing restriction or throttling action to fluid flow through the chamber 21 is to cause an increasing back pressure in the return line 6 and thus to the ports of the open centre valve 3-this has the effect of alleviating the aforementioned hissing noise which could otherwise develop.

Once the steering manoeuvre has been completed and the open centre valve returns to its neutral or open centre condition the spool 23 can revert to its fully-in position as shown in FIG. 2. A spring 31 is provided, to assist this latter movement of the spool or alternative biasing means can be provided, for example, the spool 23 and its cylinder can be redesigned to provide a pressure bias by arranging for the spool to have and maintain different and opposed effective pressurized end faces in the chamber 21 and in communication with the port 15, the effective pressurized end face in the chamber 21 being greater than that end face in communication with the port 15.

It is possible that the spool 23 will be somewhat sensitive to the fluid pressure differentials to which it is subjected and may, as a consequence, reciprocate axially in the bore 17 and therefore in itself be a source of an irritating noise or clatter. To alleviate this possibility the spool can be subjected to radial loading to increase ther esistance to its sliding movement in the bore 17. For example an internal passage 26 can be provided in the housing 16 to communicate between the port 15 and the bore 17 at a position where fluid pressure at the port 15 will always act on the side face of the spool part 24 to bias such part radially in its bore.

Figure 3:
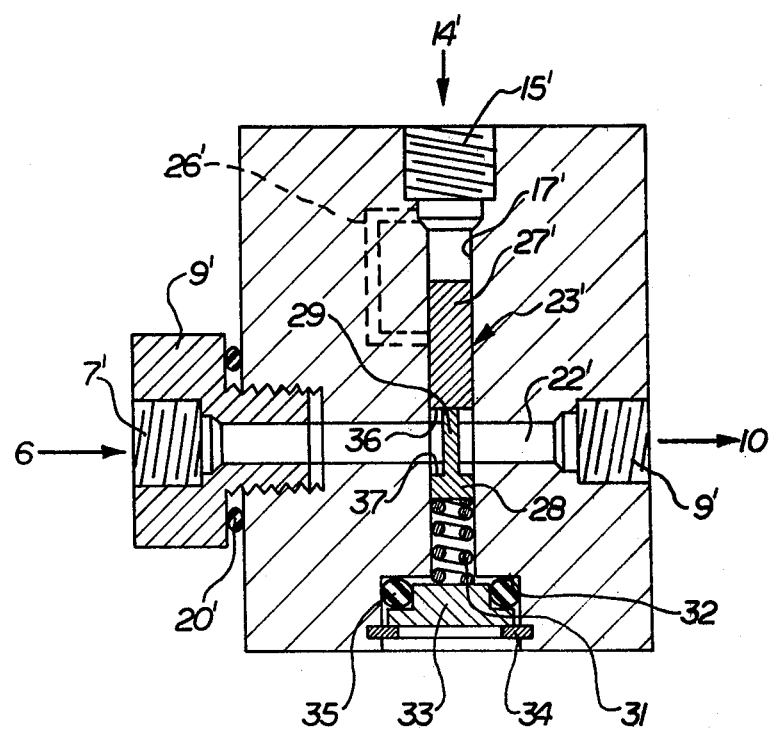
FIG. 3 is a section through another embodiment of the restrictor which may be incorporated in the system of FIG. 1.

FIG. 3 shows another embodiment of a restrictor which may be incorporated in the system of FIG. 1. In FIG. 3 similar reference numerals have been used to indicate similar parts with a ' (prime) appended.

In this embodiment the inlet port 7' is located opposite the outlet port 9', and passage 22' communicates the two ports. The passage 22' is intersected by bore 17' in which the spool 23' is located. The spool 23' is slidable in the bore 17' and controls the flow of fluid through the passage 22'.

The spool 23' consists of two cylindrical portions 27 and 28 of equal diameter, and of a third portion 29, of reduced diameter which connects portions 27 and 28. End surfaces 36 and 37 of portions 27 and 28 of the spool 23' have equal cross-sectional areas. The length of the reduced diameter portion 29 is slightly greater than the diameter of passage 22' so that the spool 23' can slide axially in the bore 17' without having any effect on the flow through passage 22'.

The spool 23' is biased to a position of minimum restriction of the flow through passage 22'. At the end of the bore 17' opposite the inlet 15 there is provided a recess 32 in which is located cap 33 for supporting a spring 31'. The spring 31' acts between the cap 33 and the portion 28 of the spool 23' to bias the latter to a minimum restriction position in which the reduced diameter portion 29 of the spool 23' is located in the passage 22'. The cap 33 is kept in place by snap ring 34. A seal 35 prevents any leakage from bore 17'.

When the spool 23' is in its normal position, the hydraulic fluid entering the inlet port 7 flows around the reduced diameter portion of the spool to the outlet port 9 and to the sink 11 (FIG. 1). The pressure upstream of the open centre valve 3 and downstream of the pump 12 is communicated to port 15' (FIG. 3) and when it rises sufficiently to exceed the force of the spring 31', the spool 23' will move downward as viewed in FIG. 3. This downward movement will produce a restriction in the passage 22' because the area through which the return fluid flows will be reduced.

The return fluid pressure in passage 22' does not affect the position of the spool 23' because the pressure acting on the end surface 36 of the portion 27 is evenly balanced by the pressure acting on the end surface 37 of the portion 28.

The passage 26' provides a radial load on the spool 23' to dampen its motion in the same manner as described with references to passage 26 in FIG. 2.

Figure 4:
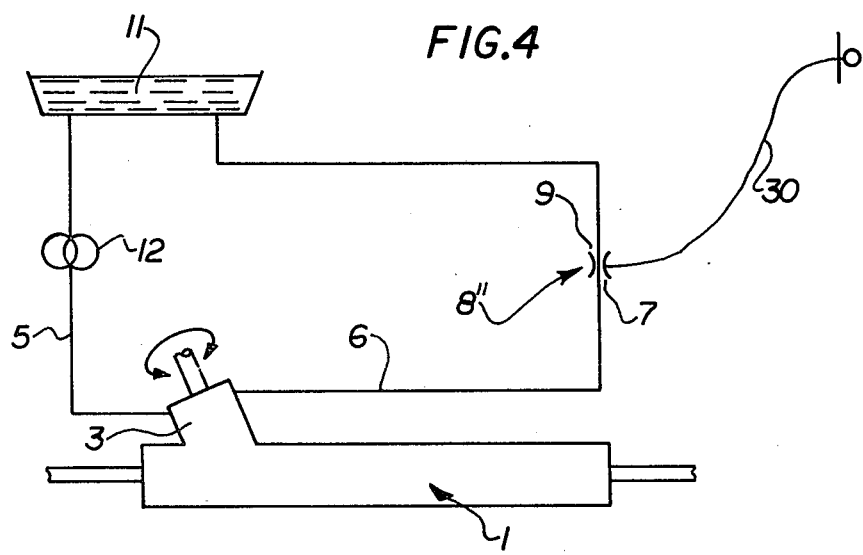
FIG. 4 is a second embodiment of power assisted vehicle steering gear in accordance with the invention in which control of the restrictor is achieved by manual adjustment.

In the embodiment in FIG. 4 the restrictor unit 8" is particularly intended for manual adjustment to vary the throttling effect on fluid flow between lines 6 and 10 and merely comprises a needle valve the needle of which is adjustable to vary the throttling effect by remote control through a cable 30. This embodiment is particularly useful in such cases where the speed of pump 12 is proportional to the vehicle engine speed and noise is likely to develop as a result of the fluid speed through the open centre valve 3 increasing by virtue of an increase in engine speed and thereby of the pump.

For convenience of installation it is possible for the housings of the restrictor units 8 and 8" to be formed as an integral part of or attached to the housing or casing of the steering gear 1, the pump 12 or the reservoir 11.

I claim:

1. An apparatus for use in a power steering system having a pump to supply fluid under pressure to actuate a motor which turns a steerable vehicle wheel, said apparatus comprising a steering control valve having means for receiving fluid under pressure from the pump and means for transmitting a return fluid flow which is conducted from a power steering motor to a reservoir during turning movement of the steerable wheel, restrictor means for throttling the return fluid flow from the steering control valve as a function of the output pressure from the pump, said restrictor means having an inlet port for receiving the return fluid flow from said steering control valve, an outlet port through which the return fluid flow is discharged from said restrictor means, a throttle chamber connected in fluid communication with said inlet and outlet ports, a movable throttle member, said throttle member having a head portion and a stem portion, said head portion of said throttle member being disposed in said chamber and being movable from a first position toward one of said ports to restrict the flow of fluid from said inlet port to said outlet port, an annular stop surface disposed in said chamber opposite from said one of said ports, said head portion of said throttle member having an annular rim with a first side surface which is disposed in engagement with said stop surface when said throttle member is in the first position, a coil spring disposed in said chamber and urging said throttle member toward the first position, said coil spring engaging a second side surface of said annular rim on said head portion of said throttle member and circumscribing said one of said ports so that the return fluid flow enters said chamber through said inlet port and passes between turns of said coil spring before flowing from said chamber through said outlet port, means for exposing an end surface on said stem portion of said throttle member to fluid pressure conducted from the output of the pump to urge said head portion of said throttle member toward said one of said ports against the influence of said coil spring with a force which varies as a function of variations in the fluid pressure conducted from the pump to effect movement of said throttle member toward said one of said ports when a pressure differential between the stem and head portions of said throttle member exceeds a predetermined amount, and surface means defining a passage in which said stem portion of said throttle member is disposed, said passage having a length which is greater than the length of said stem portion, said stop surface being disposed adjacent to one end of said passage, the end surface on said stem portion being disposed in said passage between said one end of said passage and the opposite end of said passage, said opposite end of said passage being connected in communication with the outlet fluid pressure from said pump.

2. An apparatus as set forth in claim 1 further including means for exposing a side surface area of said stem portion to fluid pressure conducted from the output of the pump to press said stem portion against a side surface of said passage to dampen movement of said throttle member.

* * * * *